United States Patent [19]

Frontiere

[11] 4,368,580
[45] Jan. 18, 1983

[54] APPARATUS FOR TESTING THE DIAMETER OF A CYLINDRICAL HOLE MACHINED IN A VERY THICK PART

[75] Inventor: Gilles Frontiere, Chalon-sur-Saone, France

[73] Assignee: Framatome, Courbevoie, France

[21] Appl. No.: 190,390

[22] Filed: Sep. 24, 1980

[30] Foreign Application Priority Data

Oct. 8, 1979 [FR] France .................. 79 24985

[51] Int. Cl.³ ............................. G01B 7/28
[52] U.S. Cl. .................... 33/178 R; 33/172 E
[58] Field of Search ............ 33/172 R, 172 E, 178 R, 33/178 E, 178 F, 147 K

[56] References Cited

U.S. PATENT DOCUMENTS 2,571,161 10/1951 Poole ............................. 33/174 L
3,750,295 8/1973 Nordmann et al. ............ 33/174 L
4,167,066 9/1979 Cooper et al. ................. 33/174 P Primary Examiner—Harry N. Haroian
Attorney, Agent, or Firm—Pollock, Vande Sande & Priddy

[57] ABSTRACT

Apparatus for testing the diameter of a cylindrical hole machined in a very thick part, comprising a first support having a central cavity in axial continuation of the hole to be tested and a second support mounted rotatably on the first support and having an axial cavity. A shaft bearing a bore-testing means passes axially through the cavities in the supports. A motor driving the support by means of gearing allows the second support to be angularly oriented with respect to the first, and a second drive allows the shaft to be driven in an axial translation movement. Controls for the first and second drives allow a scan to be made successively of the entire length of the hole along two generatrices of a first plane passing through the axis of the hole and along two generatrices of a second plane passing through the axis of the hole. The invention is particularly applicable to bore-testing the holes of a steam generator tube sheet of a pressurized water nuclear reactor.

6 Claims, 3 Drawing Figures

APPARATUS FOR TESTING THE DIAMETER OF A CYLINDRICAL HOLE MACHINED IN A VERY THICK PART

BACKGROUND OF THE INVENTION

The invention concerns an apparatus for testing the diameter of a cylindrical hole machined in a very thick part, in two different planes through the axis of the hole and along its entire length.

In the manufacture of steam generators, such as steam generators used in pressurized water nuclear reactors, it is necessary to carry out dimension testing of cylindrical holes passing through the tube sheet, after they have been machined.

In practice, these very long cylindrical holes passing through the tube sheet receive the tubes of the bank which are secured inside these holes in the tube sheet by flanging over.

To assure a good join between the tubes and the sheet, it is therefore necessary for all the holes in the tube sheet to be of constant section over the whole thickness of the sheet.

To test that this section of the hole is truly constant, over the whole extent of the sheet, measurements must be made over the whole length of the boring, and in the different axial planes, i.e., passing through the axis of the hole.

The testing of diameters is generally carried out in two perpendicular axial planes and over the whole length of the hole through the tube sheet.

To carry out this dimension testing, a manually controlled apparatus is used, allowing a plug bearing a feeler, such as an electronic feeler, to be moved inside the hole allowing the values of the diameter to be displayed very accurately on a display screen.

Complete scanning of the entire length of the hole in two axial planes forming an angle of 90° is carried out for each hole.

This method of testing is not, however, entirely satisfactory because of the inaccuracy of the measurements, due to the fact that the speed of movement of the plug bearing the measuring feeler is not constant and that the position of the feeler along the length of the hole during measurements is not known accurately.

In addition, movement by manual means of the measuring plug which has to be duplicated for each hole passing through the tube sheet is a lengthy and difficult operation to carry out.

An apparatus described in French Pat. No. 2,386,803 and allows some automation of the operations involved in dimension-testing a bore.

The apparatus described comprises a measuring head with movable contacts angularly movable by a system of pawls when the apparatus is positioned and axially secured in the bore.

The measurement can be displayed either on the body of the apparatus or on a separate recording unit.

Such an apparatus allows dimension faults in the bore to be detected in a radial plane but not in angularly disposed, axial planes.

There is therefore no known apparatus capable of carrying out dimension testing over the whole length of a hole made in a very thick part and in different axial planes.

The object of the invention is therefore an apparatus for testing the diameter of a cylindrical hole machined in a very thick part, in two different planes passing through the axis of the hole and proceeding over its entire length, this apparatus allowing uniform and exact movements of a diameter-measuring apparatus to be carried out and testing to be carried out rapidly and automatically.

SUMMARY OF THE INVENTION

With this aim, the apparatus according to the invention comprises:
 (a) a first support with a central cavity over its entire length and means for fixing it removably on the very thick part, so that the cavity is arranged as a continuation of the hole;
 (b) a second support mounted on the first support, rotatable about an axis coinciding with the axis of the hole when the first support is fixed on the very thick part, including a cavity in the axial direction, in the continuation of the central cavity of the first support;
 (c) a shaft bearing a bore-testing means at one of its ends arranged axially inside the cavities of the two supports, so that its end bearing the bore-testing means is directed towards the hole in the very thick part, the diameter of the shaft and the transverse dimensions of the testing means allowing them to be freely moved inside the hole;
 (d) a first driving means mounted on the first support so that the second support can be angularly oriented and locked in position with respect to the first, in one of two positions corresponding respectively to the positions which allow testing in one or the other of the axial planes; and
 (e) a second driving means and guiding means borne by the second support for moving the shaft in axial translation in both directions, over a distance at least equal to the length of the hole, the shaft moving freely inside the axial cavity of the first support, and means for controlling the first and second driving means for starting the first means in one direction or the other and stopping the second, when the second driving means has carried out a complete translation corresponding to the stroke of the testing means over the whole length of the hole, in one direction or the other, and inversely for stopping the first driving means and starting the second, when the first driving means has finished its movement of orienting the second support in one direction or the other.

In order that the invention may be more clearly understood, an embodiment of the apparatus according to the invention will now be described, with reference to the attached drawings.

DETAILED DESCRIPTION OF AN EMBODIMENT

The apparatus represented in the figures is used for testing the diameters of holes passing through the tube sheet of a steam generator of a pressurized water reactor.

In such a very thick sheet, the holes inside which the steam generator tubes are secured by flanging over are arranged in a regular lattice with square mesh, and pass through the whole thickness of the sheet.

Figure 1:
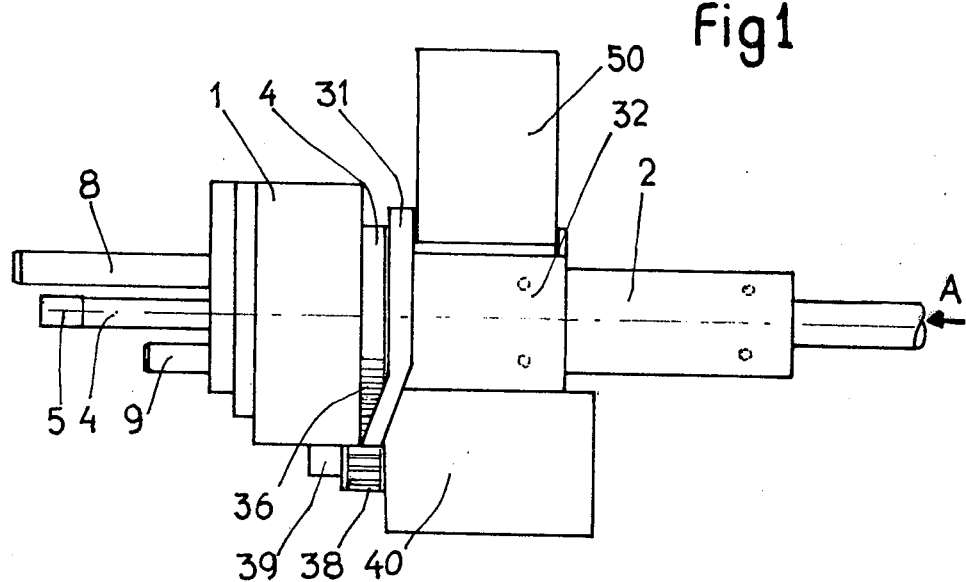
FIG. 1 represents a plan view of the apparatus according to the invention with its axis in horizontal position.
Figure 2:
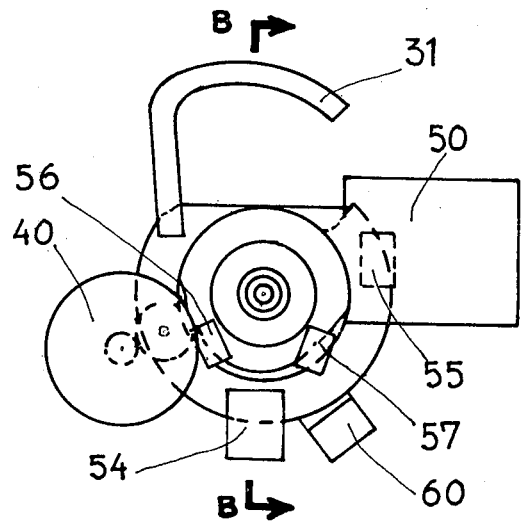
FIG. 2 represents a view along A of FIG. 1.
Figure 3:
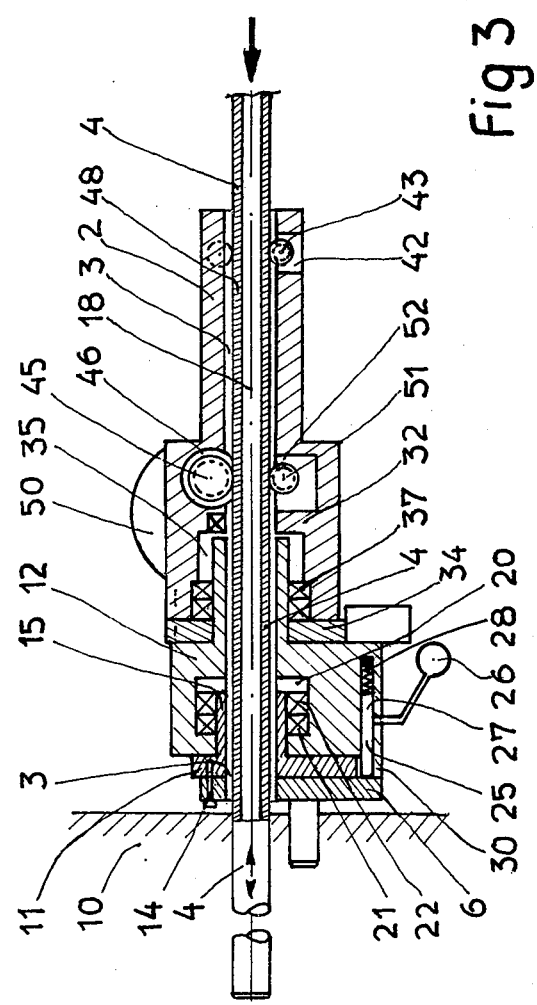
FIG. 3 represents a section at B—B of FIG. 2.

As shown in FIGS. 1, 2 and 3, the apparatus is constituted by an assembly of two supports 1 and 2 with a central cavity 3 passing right through them, inside which a shaft 4 is arranged, bearing the measuring plug 5 at its end.

When the apparatus is in position on the sheet 10 during testing, the support 1, or first support, assures positioning of the testing apparatus on this sheet by means of two centering members 8 and 9 introduced into two adjacent holes in the tube sheet.

The first support 1 has a base plate 6 bearing the two centering members 8 and 9 which are rigidly connected to it, an intermediate plate 11 fixed to the base plate 6 by screws 14, solid with a hollow shaft 15 extending the plate 11 outwards and a housing 12 providing with the hollow shaft 15 in the axial direction 18 a part of the axial cavity 3 in which the shaft 4 is disposed.

The housing 12 also provides an annular seating 20 about the outer surface of the shaft 15 inside which rolling bearings 21 and 22 are disposed, whose outer ring is solid with the housing 12 and whose inner ring is solid with the shaft 15. The bearings 21 and 22 have the axis 18 of the whole of the apparatus as a common axis.

The outer part of the support 1 bearing the support 2 and the shaft 4 can, by means of this arrangement, be made to turn about the axis 18, with respect to the inner part of the support 1 whose position is fixed with respect to the tube sheet 10.

A locking apparatus 25 comprising a handle 26, a finger 27 and a spring 28 cooperating with an aperture 30 provided in the intermediate plate 11 of the support 1 allows the rear part of the apparatus to be locked in rotation with respect to the front part positioned on the tube sheet 10.

By maneuvering the handle 26, the apparatus can be placed in an angular position allowing its adaptation to the region of the tube sheet on which the test is carried out.

The centering members 8 and 9 are so disposed on the base plate 6 that they as well as the shaft 4 disposed along the axis 18 of the apparatus can be engaged simultaneously in three adjacent holes in the tube sheet 10.

A handle 31 solid with the housing 1 allows the apparatus to be gripped and carried about.

The outer support 2, or second support, is constituted by an elongate housing 32 pierced by an axial cavity which becomes the continuation of the axial cavity of the support 1 so as to constitute the housing 3 of the shaft 4 and a flange 34 partially closing the housing 32 at its end, assuring connection with the support 1.

In this part, the housing 32 provides a seating 35 about the part of the housing 12 of the lower support 1 constituting a hollow shaft.

In the seating 35, rolling bearings 37 are disposed whose inner ring is connected to the housing 12 and whose outer ring is connected to the housing 32.

The rolling bearings 37 have the axis 18 of the apparatus as a common axis and are held in the seating 35 by the flange 34.

Over part of its periphery, the base plate 34 has a toothed sector 36 engaged with a pinion 38 solid with the output shaft 39 of a motor 40 carried by the support 1.

The toothed sector 36 engaged with the pinion 38 allows a rotation of 90° of the support 2 to be carried out with respect to the support 1, when the motor 40 is supplied for a short time which is sufficient for carrying out the rotation. The motor 40 also assures the locking of the support 2 in angular position with respect to the support 1.

The housing 32, in apertures such as 42, bears a set of three rollers such as 43 arranged at 120° intervals about the axial cavity 3 of the housing 32 and projecting slightly into this cavity.

The housing 32 also bears a pinion 45 rotatably mounted inside a recess 46 of the housing and connected to the shaft of a motor 50 allowing it to be set in rotation.

The pinion 45 slightly projects into the axial cavity 3 of the housing 32 and engages with a rack 48 machined on one part of the outer surface of the shaft 4.

A roller 51 mounted in an aperture 52 of the housing 32 and projecting slightly into the cavity 3, so that it is in rolling contact with the shaft 4, allows a radial thrust to be exerted on the shaft 4 in opposition to the thrust exerted by the pinion 45.

The pinion 45 and its opposing roller 51 as well as the rollers 43 allow the shaft 4 to be driven in axial translation and guided inside the support 2.

The shaft 4 moves freely through the axial cavity 3 provided in the support 1, this cylindrical cavity having a diameter greater than that of the shaft 4.

The length of the rack machined on the shaft 4 is sufficient for this shaft to be movable in translation in a movement with an amplitude at least equal to the length of the hole to be tested.

The supply to the motor 50 allows the shaft 4 to be moved in one direction and in the other by reversal of the direction of rotation.

The support 1 also bears two electrical contacts 54 and 55 with push-rods cooperating with the outer surface of the support 2 which has a profile constituting a cam in the region opposite the contactors 54 and 55, when the support 2 rotates a quarter turn in one direction or the other with respect to the support 1.

The contactor 54 is actuated by the cam machined on the support 2 when this support has finished its orienting movement about the axis 18, with respect to the support 1, in one direction and this contactor 54 then cuts off the supply to the motor 40 and causes the motor 50 to be supplied so as to make the shaft 4 and the diameter-testing means connected to its end carry out one translation inside a hole of the tube sheet.

The contactor 55 carries out the same operations when the support 2 is in the other angular position with respect to the support 1.

Two other contactors 56 and 57 with push-rods are also disposed inside the housing 32, holes in the radial direction opening into the central cavity 3 assuring passage for the rods of the push-rods actuated by balls slightly projecting into the cavity 3 cooperating with the outer surface of the shaft 4 which has grooves, so that the rods of the push-rods are not actuated during passage of the grooves of the shaft past the contactors 56 and 57.

At the end of the stroke of the shaft 4 in one direction or the other, a region of this shaft without grooves arrives opposite the contactors so that the contactors 56 and 57 are actuated to stop the motor 50 and start the motor 40 in one direction or in the other.

Operation of the apparatus can thus be made entirely automatic.

The intermediate plate 11 also bears a contactor 60 which is closed when the apparatus is in its correct position above the tested sheet 10.

The operation cycle of the apparatus can then be started to test a hole in the tube sheet.

To place the testing apparatus in position for use, it is sufficient to adjust the angular orientation of the rotary part of the support 1 with respect to the fixed part so that the centering members 8 and 9 can be positioned in two holes of the tube sheet adjacent the holes to be tested. For this positioning, the shaft 4 is entirely retracted inside the apparatus and, when positioning is achieved, the axis 18 of the shaft 4 is made coincident with the axis of the hole to be tested, the arrangement of the centering members 8 and 9 with respect to the axis of the apparatus being provided to duplicate the triangular mesh of three adjacent holes.

When the apparatus is correctly positioned, the safety contactor 60 is closed and the testing cycle can be started.

The motor 50 is supplied by means of one of the contactors 54 and 55 so that the pinion 45 set in rotation by the motor makes the measuring plug disposed at the end of the shaft 4 go into the hole to be tested in a movement at constant speed during which the electronic measuring feeler disposed at the end of the shaft 4 scans the inner surface of the hole along two generatrices contained in an axial plane containing the axis of the feeler.

During its penetration at constant speed into the hole, the electronic feeler transmits digital signals representative of the measurements of the diameters to an apparatus allowing continuous storage of the measurements made during the advance of the feeler.

This storage of the measured values of the diameter allows display on a display member of the maximum and minimum values of the measured diameter during one scan.

The storage and display apparatus is connected by cables to the measuring feeler.

When the feeler comes to the end of its stroke, i.e., at the outlet end of the hole being tested, the shaft 4 actuates the contactors 56 and 57 which, on the one hand, allow the motor 50 to be stopped and, on the other hand, set the motor 40 in rotation so as to bring the support 2 and the shaft 4 which is solid in rotation with this support into a new angular position with respect to the hole.

The rotation of the support 2 with respect to the support 1 and to the sheet continues until one of the contactors 54 and 55 is actuated by the part of the surface of the support 2 constituting a cam acting on the push-rod of the contactor.

The contactor then causes the motor 40 responsible for setting in rotation the support 2 by means of the pinion 37 and the toothed sector 36 to stop and starts the motor 50 in the opposite direction to the previous movement, so that the setting in rotation of the gear 45 engaging with the rack 48 of the shaft 4 causes retraction of the shaft 4 which is accompanied by scanning of the inner surface of the hole by the electronic feeler in the opposite direction to the previous and along two generatrices arranged in a plane perpendicular to the axial measuring plane of the preceding operation.

At the end of the stroke of the shaft 4, the contactors 56 and 57 are actuated to stop the motor 50 and start the motor 40 so as to reset the feeler in its angular starting position, which ends the operating cycle constituting one measurement relating to one hole in the tube sheet.

The maximum and minimum values of the diameter measured can be recorded for each plane of measurement or, alternatively, for the two axial planes of measurement together.

When testing of one of the holes of the tube sheet has finished, the position of the testing apparatus is changed by means of the handle 31 and, if necessary, the orientation of the apparatus with respect to the base plate is changed by means of the handle 26, introducing the centering members 8 and 9 into holes near the new hole to be tested.

When the apparatus is in position and the contactor 60 is closed, a new measuring cycle can start.

It will be seen that the principal advantages of the apparatus according to the invention are that it allows diameter measurements to be made along the entire length of the hole and in two axial planes angularly disposed, for example at 90°, in an entirely automatic way and with a very constant speed of movement for the measuring feeler. It will also be seen that the positioning of the apparatus in any testing position on the tube sheet is very easy to carry out.

Thanks to the storage of the values measured during the movement, it is also possible to obtain an output in any visual or printed form of any value representative of the measurements made.

The testing apparatus according to the invention is therefore particularly useful when a very great number of holes arranged in a regular lattice are concerned, as in the case of a tube sheet of a steam generator of a pressurized water reactor.

In addition, when successive testing is required of tube sheets with bores of different diameters arranged in lattices with different sized mesh, changing over from a testing operation on one tube sheet to a testing operation on another tube sheet only requires changing the plate bearing the centering members, the feeler-carrying plug and, if necessary, the rack shaft at the end of which the plug is fixed.

The invention is not limited to the embodiment just described; it also includes all the variants thereof.

Thus, it is possible to envisage other means for varying the angular position of the second support with respect to the first than a motor driving a pinion and a toothed sector, and it is possible to envisage other driving means for moving the axial shaft bearing the measuring feeler in translation than a rack and pinion apparatus.

Similarly, control of the movements of the second support and the shaft can be achieved in a way different from that described.

Provision can also be made for resetting the feeler in its starting position at the beginning of a cycle.

Instead of mechanical apparatuses, hydraulic or pneumatic apparatuses can be used to move the shaft and change the angular position of the second support with respect to the first.

Also, use can be made of any type of feeler disposed at the end of the shaft entering the hole to be tested, as long as this apparatus is sufficiently sensitive.

The first support can also be made in two parts to allow orientation of one of these parts and the second support with respect to the part of the first support serving for fixing to the tube sheet, or instead as a single part if the group of holes of the tube sheet can be tested without changing the relative position of the centering members and the axis of the apparatus.

The invention is also applicable in all instances in which dimension testing is required of a great number of holes made in a very thick part and constituting a regular lattice over the faces of this part. Its application therefore extends beyond the field of the manufacture and testing of steam generator tube sheets, and use of the apparatus can even be envisaged for testing isolated holes in very thick parts, the first support then having to be provided with apparatuses allowing it to be adapted to and fixed on the part to be tested.

I claim:

1. Apparatus for testing the diameter of a cylindrical hole machined in a very thick part (10), in two different planes passing through the axis of the hole and along its whole length, comprising
    (a) a first support (1) comprising a central cavity (3) over its entire length and means (8, 9) for fixing it removably on the very thick part (10), so that the cavity (3) is arranged as the continuation of said hole;
    (b) a second support (2) mounted on said first support (1), rotatable about an axis coinciding with the axis of said hole when said first support is fixed on said very thick part, having a cavity in the axial direction in continuation of said central cavity (3) of said first support;
    (c) a shaft (4) bearing a bore-testing means (5) at one of its ends disposed axially inside said cavity (3) of said supports (1, 2) so that its end bearing said bore-testing means (5) is directed towards said hole in said very thick part, the diameter of said shaft and the transverse dimensions of said testing means allowing their free movement inside said hole;
    (d) a first driving means (40) mounted on said first support (1) so that said second support (2) can be angularly oriented and locked in position with respect to the first, in one or the other of two positions allowing testing to be carried out in one or the other of said axial planes;
    (e) a second driving means (50) and guiding means (43, 45) borne by said second support (2) for moving said shaft (4) in axial translation in one direction and in the other over a distance at least equal to the length of said hole, said shaft moving freely inside said axial cavity (3) of said first support; and
    (f) means (54, 55, 56, 57) for controlling said first (40) and said second (50) driving means for starting said first driving means in one direction or the other and stopping said second driving means when the latter has carried out a complete translation corresponding to the stroke of said testing means over the entire length of said hole in one direction or the other, and inversely for stopping said first driving means and starting said second driving means when said first driving means has finished its movement for orienting said second support, in one direction or in the other.

2. Testing apparatus according to claim 1, wherein said first support (1) comprises a first part (6, 11) for attachment on said very thick part (10) at the holes to be tested, and a second part (12) mounted rotatably on said first part about an axis coinciding with the axis of said hole when the apparatus is in testing position, provided with a means (25) for locking in any angular position with respect to said first part.

3. Testing apparatus according to claim 1 or 2, wherein said first driving means (40) is constituted by an electric motor fixed on said first support (1), the shaft of said motor driving a pinion (38) engaging with a toothed sector (36) borne by said second support (2).

4. Testing apparatus according to claim 1 or 2, wherein said second driving means is constituted by an electric motor fixed on said second support (2), the shaft of said motor driving a pinion (45) engaging with a rack (48) solid with said shaft (4) bearing said testing means (5).

5. Testing apparatus according to claim 1 or 2, wherein said control means of said first and second driving means are constituted by contacts with push-rods, some of said push-rods (54, 55) being actuated by a cam machined on said second support (2), on rotation of said second support with respect to said first support, the remaining push-rods (56, 57) being actuated by said shaft (4) during its axial translation movements.

6. Testing apparatus according to claim 1 or 2, for use when a great number of cylindrical holes are machined according to a regular lattice in a very thick part (10), wherein said means for attaching said first support on said very thick part comprise a base plate (6) bearing centering apparatuses (8, 9) constituted by cylindrical rods of a diameter approaching that of said holes in said very thick part, said centering apparatuses (8, 9) and said shaft (4) bearing said testing means being arranged so as to register with a set of holes in said very thick part.

* * * * *